United States Patent
Yilmaz et al.

(10) Patent No.: US 9,785,292 B2
(45) Date of Patent: Oct. 10, 2017

(54) VARIABLE-PITCH TRACKING FOR TOUCH SENSORS

(71) Applicants: Esat Yilmaz, Santa Cruz, CA (US); Jalil Shaikh, Fremont, CA (US)

(72) Inventors: Esat Yilmaz, Santa Cruz, CA (US); Jalil Shaikh, Fremont, CA (US)

(73) Assignee: Atmel Corporation, San Jose, CA (US)

( * ) Notice: Subject to any disclaimer, the term of this patent is extended or adjusted under 35 U.S.C. 154(b) by 143 days.

(21) Appl. No.: 14/201,599

(22) Filed: Mar. 7, 2014

(65) Prior Publication Data

US 2015/0253893 A1    Sep. 10, 2015

(51) Int. Cl.
    *G06F 3/044*    (2006.01)

(52) U.S. Cl.
    CPC .................................... *G06F 3/044* (2013.01)

(58) Field of Classification Search
    CPC ........... G06F 3/044; G06F 2203/04103; G02F 1/13338
    USPC ............................................ 345/43, 173–174
    See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2007/0279395 A1* | 12/2007 | Philipp | G06F 3/044 345/173 |
| 2008/0309635 A1 | 12/2008 | Matsuo | |
| 2009/0315854 A1 | 12/2009 | Matsuo | |
| 2012/0146919 A1* | 6/2012 | Kim et al. | 345/173 |
| 2012/0242585 A1* | 9/2012 | Jones et al. | 345/173 |
| 2012/0242588 A1 | 9/2012 | Myers | |
| 2012/0242592 A1 | 9/2012 | Rothkopf | |

(Continued)

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Amare Mengistu
*Assistant Examiner* — Gloryvid Figueroa-Gibson
(74) *Attorney, Agent, or Firm* — Baker Botts L.L.P.

(57) ABSTRACT

In one embodiment, a touch sensor includes a first set of tracks configured to electrically couple a first set of connection pads of the touch sensor to a first set of electrodes of the touch sensor. At least a portion of the first set of tracks extends in a direction, and at least one of the tracks in the first set of tracks has two or more different pitches at two or more different points along the extent of the first set of tracks. The touch sensor also includes a second set of tracks configured to electrically couple a second set of connection pads of the touch sensor to a second set of electrodes of the touch sensor. At least a portion of the second set of tracks extends in the direction and adjacent to the extent of the first set of tracks.

20 Claims, 7 Drawing Sheets

(56) References Cited

U.S. PATENT DOCUMENTS

2012/0243151 A1 9/2012 Lynch
2012/0243719 A1 9/2012 Franklin
2013/0076612 A1 3/2013 Myers

* cited by examiner

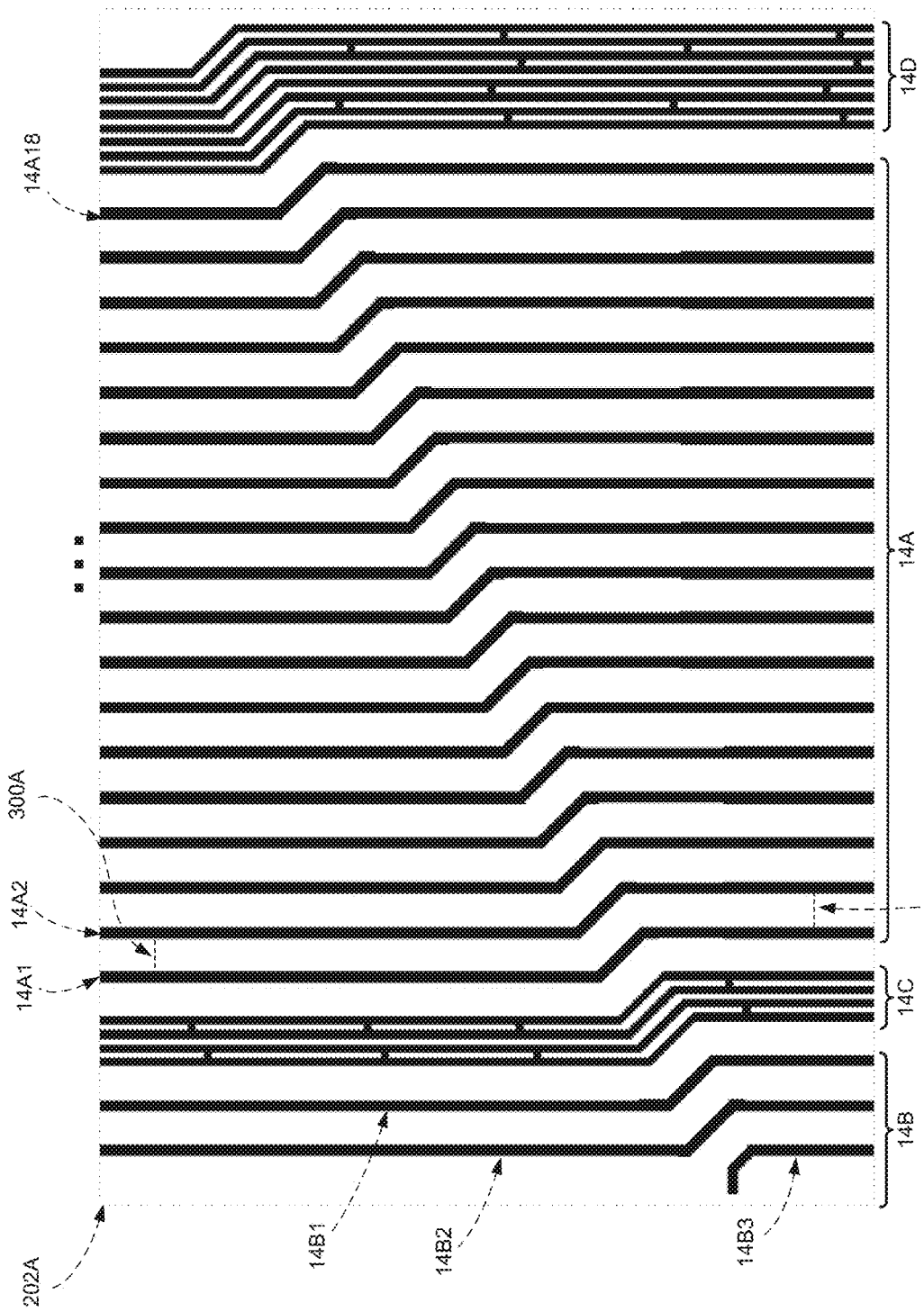

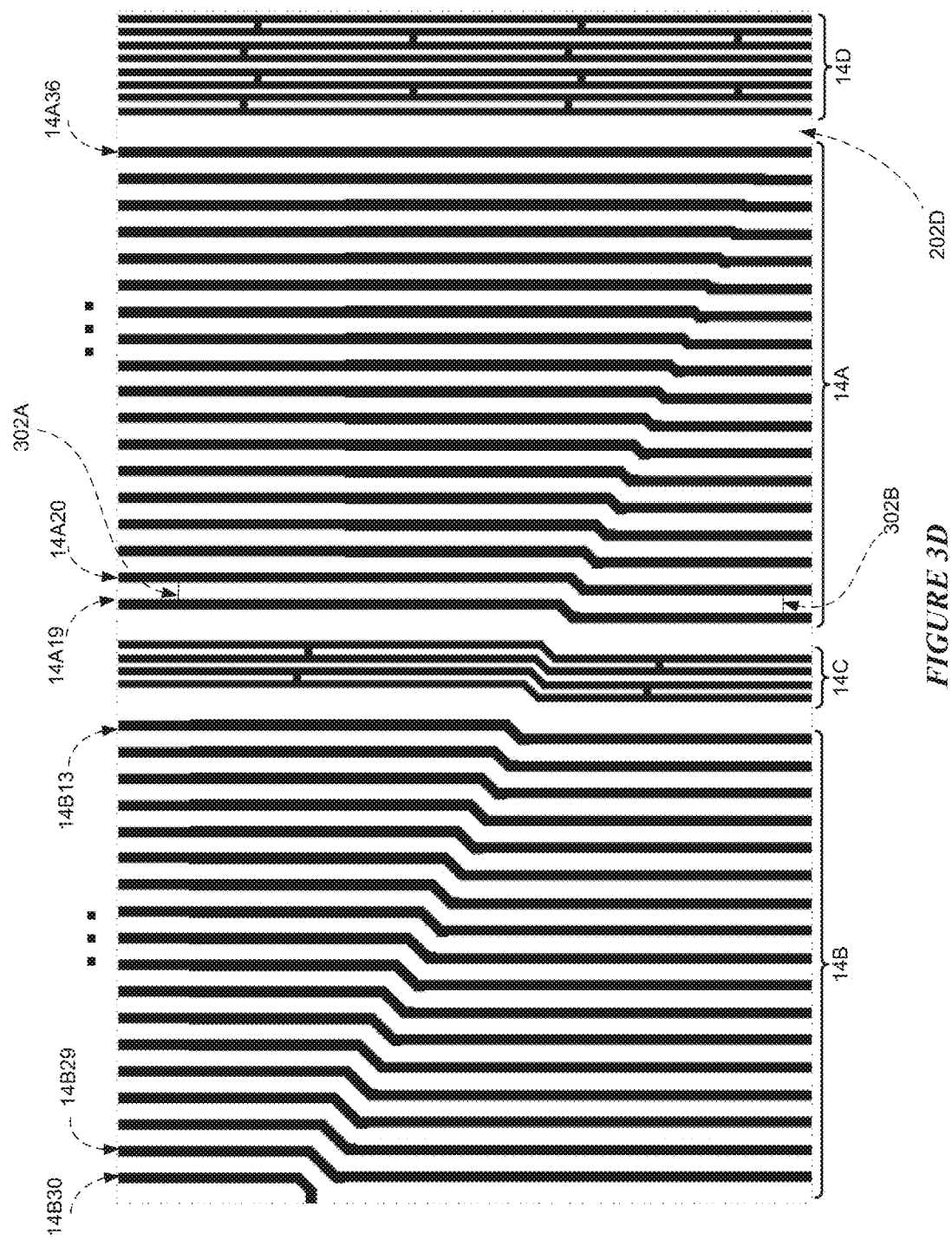

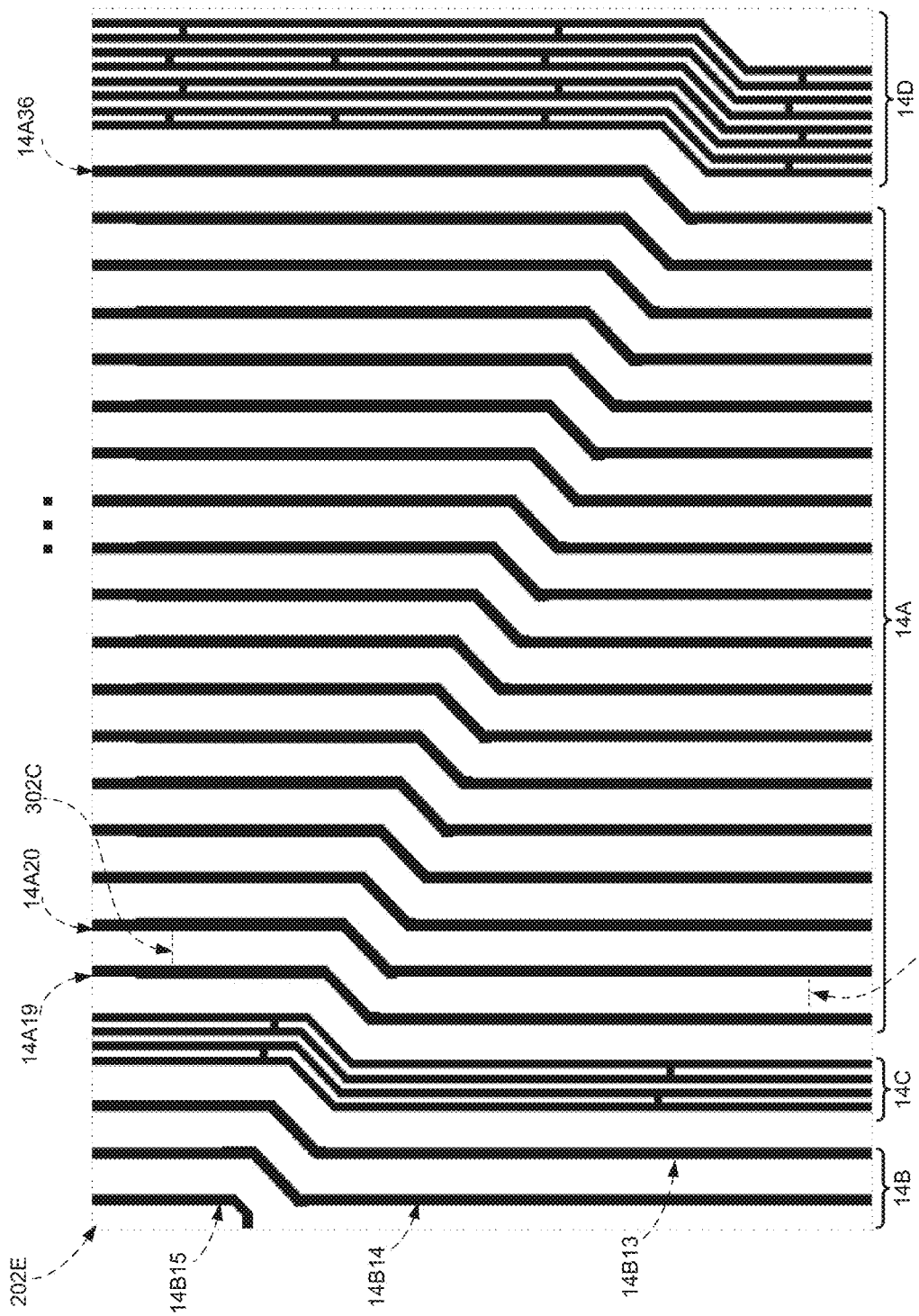

ations to US 9,785,292 B2

VARIABLE-PITCH TRACKING FOR TOUCH SENSORS

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

BRIEF DESCRIPTION OF THE DRAWINGS

FIG. 3A illustrates a section of the tracking area of FIG. 2 with example tracks.

FIG. 3D illustrates another section of the tracking area of FIG. 2 with example tracks.

FIG. 3E illustrates another section of the tracking area of FIG. 2 with example tracks.

DESCRIPTION OF EXAMPLE EMBODIMENTS

Figure 1:
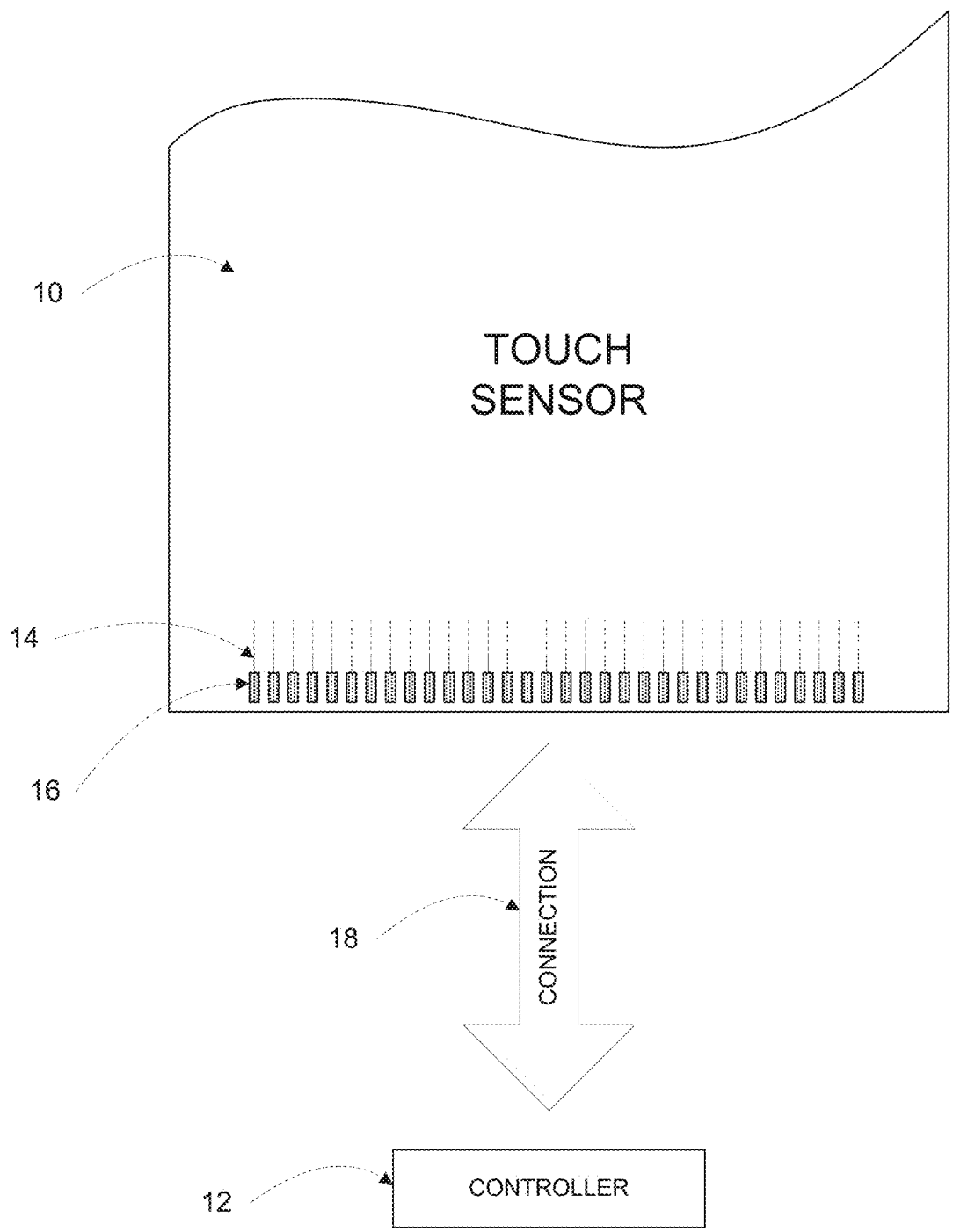
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. Additionally, one or more ground electrodes may together form a ground line running horizontally or vertically or in any suitable orientation. In particular embodiments, drive lines may run substantially perpendicular to sense lines. In particular embodiments, drive lines may run substantially parallel to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate. Additionally, reference to a ground line may encompass one or more ground electrodes making up the ground line, and vice versa, where appropriate. In particular embodiments, any electrode may be configured as a drive, sense, or ground electrode and the configuration of any electrode may be changed during operation of touch sensor 10. In particular embodiments, configuration of electrodes may be controlled by touch-sensor controller 12.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

In particular embodiments, touch sensor 10 may determine the position of an object (such as a stylus or a user's finger or hand) that makes physical contact with a touch-sensitive area of touch sensor 10. In addition or as an alternative, in particular embodiments, touch sensor 10 may determine the position of an object that comes within proximity of touch sensor 10 without necessarily contacting touch sensor 10. In particular embodiments, an object may come within proximity of touch sensor 10 when it is located some distance above a surface of touch sensor 10; when it hovers in a particular position above a surface of touch sensor 10; when it makes a motion (such as for example a swiping motion or an air gesture) above a surface of touch sensor 10; or any suitable combination of the above. In particular embodiments, determining the position of an object that comes within proximity of touch sensor 10 without making physical contact may be referred to as determining the proximity of an object. In particular embodiments, determining the proximity of an object may comprise determining the position of an object's projection onto touch sensor 10 when the object is located some distance above a plane of touch sensor 10. The projection of an object onto touch sensor 10 may be made along an axis that is substantially orthogonal to a plane of touch sensor 10. In particular embodiments, the position of an object's projection onto touch sensor 10 may be referred to as the position or the location of an object. As an example and not by way of limitation, touch sensor 10 may determine the position of an object when the object is located above the surface of touch sensor 10 and within a distance of approximately 20 mm of the surface of touch sensor 10. Although this disclosure describes or illustrates particular touch sensors 10 that may determine a position of physical contact of an object, a proximity of an object, or a combination of the two, this disclosure contemplates any suitable touch sensor 10 suitably configured to determine a position of physical contact of an object, a proximity of an object, or any suitable combination of one or more of the above.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
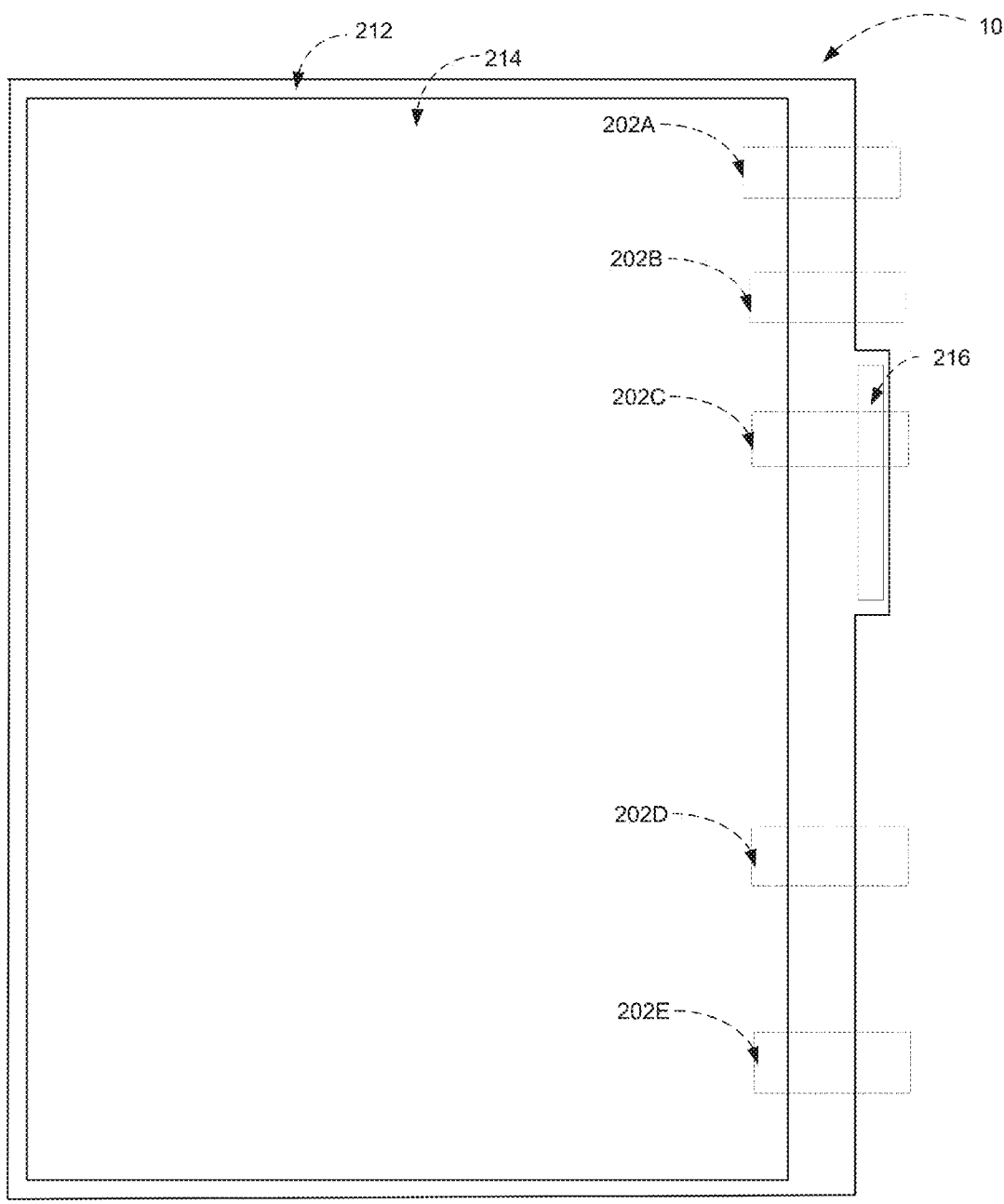
FIG. 2 illustrates an example tracking area for tracks of a touch sensor.

FIG. 2 illustrates an example tracking area 212 for tracks 14 of a touch sensor 10. In the example of FIG. 2, touch sensor 10 includes tracking area 212, a touch-sensitive area 214, and a connection-pad area 216. Herein, reference to a touch sensor may encompass one or more of a tracking area, a touch-sensitive area, or a connection-pad area, where appropriate. Touch-sensitive area 214 includes an array of drive and sense electrodes, as described above. Although this disclosure describes touch-sensitive area 214 as including both drive and sense electrodes, this disclosure contemplates touch-sensitive area 214 including an array of electrodes of a single type, wherein appropriate. Connection-pad area 216 includes connection pads 16 that facilitate coupling of tracks 14 to a touch-sensor controller, as described above. Although this disclosure describes and illustrates connection-pad area 216 as being a single continuous area, connection-pad area 216 may be made of multiple distinct areas that are separate from each other, where appropriate.

Tracking area 212 include tracks 14 that electrically couple the electrodes in touch-sensitive area 214 to connection pads 16 in connection-pad area 216. Although tracking area 212 is described and illustrated as being located along the edges of and outside touch-sensitive area 214, this disclosure contemplates any suitable portions of tracking area 212 having any suitable locations. As an example and not by way of limitation, one or more portions of tracking area 212 may overlap with or be located in one or more portions of touch-sensitive area 214. Tracking area 212 may include any suitable types of tracks 14, which for example may be differentiated by their connections or electrical or mechanical properties. In the example of FIG. 2, tracks 14 include drive tracks that electrically couple drive electrodes in touch-sensitive area 214 to connection pads 16 in connection-pad area 216. Tracks 14 also include sense tracks that electrically couple sense electrodes in touch-sensitive area 214 to connection pads 16 in connection-pad area 216. Tracks 14 also include ground lines that couple to a ground potential of a touch-sensor controller or other suitable ground potential. Such tracks may function as ground shields for touch sensor 10.

In tracking area 212, at least certain portions of at least some tracks 14 are routed and sized according to an algorithm, which may include a set of design rules. In particular embodiments, the algorithm may address manufacturing issues (such as ease of manufacture, manufacturing yield, or manufacturing costs) associated with the manufacture of touch sensor 10. In addition or as an alternative, the algorithm may take into account design considerations such as coupling noise, drive strength, signal attenuation, operating frequency, alternating current (AC) impedance, electromagnetic interference, stack-up of touch sensor 10, and size (or space) or layout of tracking area 212. The design rules may specify maximum or minimum track widths, thicknesses, or gaps. For example, the design rules may specify a maximum track width of 100 μm and a maximum track gap of 100 μm. Although this disclosure describes particular design rules, this disclosure contemplates any suitable design rules. As described below, track widths or track gaps may be increased or decreased proportionately or disproportionately along extents of tracks 14.

Herein, track pitch is the transverse distance between the center line of a first track 14 to the center line of a second track 14 that is adjacent to first track 14. Track pitch may be determined by track width, gap, or both. Reference to pitch may encompass track pitch, and vice versa, where appropriate. In the example of FIG. 2 (and illustrated more clearly in FIGS. 3A-E), as tracks 14 extend away from connection-pad area 216 along the edge of touch sensor 10, the pitch of particular tracks 14 may increase. Accordingly, particular tracks 14 have greater pitch in section 202A of tracking area 212 than in section 202B. At the same time, there are fewer tracks 14 in section 202A than in section 202B as a result of certain tracks terminating between them and not extending into section 202B. Particular tracks 14 have greater pitch in section 202E of tracking area 212 than in section 202D and there are fewer tracks 14 in section 202E than in section 202D. Tracks 14 may be cascaded as their number decreases and their pitch increases. Although this disclosure describes and illustrates particular routing of particular tracks 14 in a particular tracking area 212, this disclosure contemplates any suitable routing of any suitable tracks 14 in any suitable tracking area 212.

FIG. 3A (which is not necessarily shown to scale) illustrates section 202A of tracking area 212. In the example of FIG. 3A, there are four different sets of tracks 14. Tracks 14A electrically couple sense electrodes of touch sensor 10 to connection pads 16. Tracks 14B electrically couple drive electrodes of touch sensor 10 to connection pads 16. In section 202A, tracks 14C and 14D are ground lines. Toward the bottom of FIG. 3A, there are three tracks 14B, with track 14B3 terminating at an edge of a drive electrode in touch-sensitive area 214. Toward the top of FIG. 3A, there are only two tracks 14B. In contrast, the number of tracks 14A stays the same throughout section 202A. Where the number of tracks 14B decreases in section 202A, the pitch of tracks 14A increases. In the example of FIG. 3A, track pitch 300A between tracks 14A1 and 14A2 toward the top of FIG. 3A is larger than track pitch 300B between tracks 14A1 and 14A2 toward the bottom of FIG. 3A. Although this disclosure describes and illustrates particular changes in the pitch of particular tracks in particular sections of a particular track area, this disclosure contemplates any suitable changes in the pitch of any suitable tracks in any suitable sections of any suitable track area.

Figure 3B:
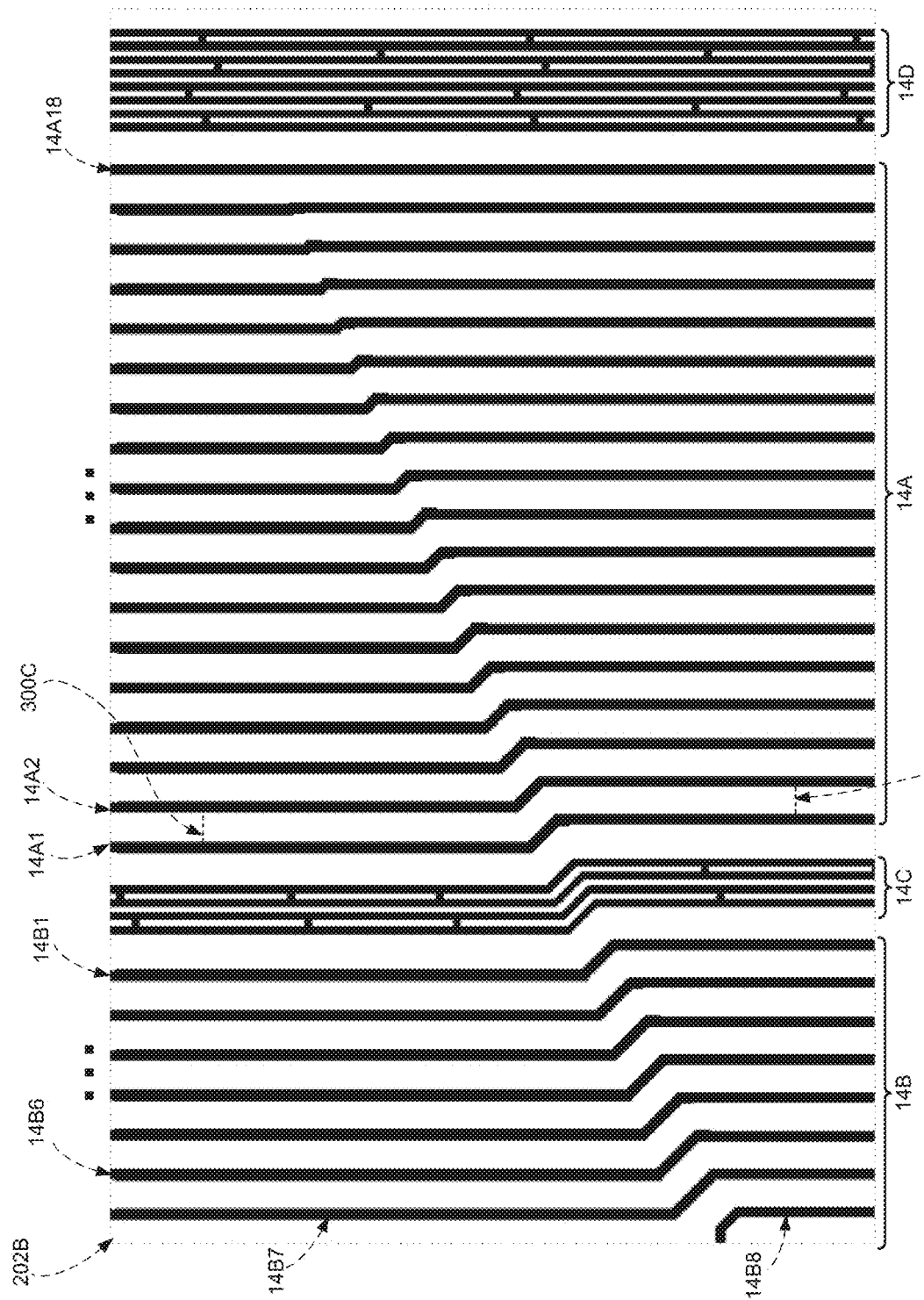
FIG. 3B illustrates another section of the tracking area of FIG. 2 with example tracks.

FIG. 3B (which is not necessarily shown to scale) illustrates section 202B of tracking area 212. In the example of FIG. 3B, there are tracks 14A-D, as described in FIG. 3A. Furthermore, there are more tracks 14B in section 202B than in section 202A. In contrast, the number of tracks 14A in section 202B stays the same, as in section 202A. Toward the bottom of FIG. 3B, there are eight tracks 14B, with track 14B8 terminating at an edge of a drive electrode in touch-sensitive area 214. Toward the top of FIG. 3A, there are only seven tracks 14B. In contrast, the number of tracks 14A stays the same throughout section 202B. Where the number of tracks 14B decreases in section 202B, the pitch of tracks 14A increases. In the example of FIG. 3B, track pitch 300C between tracks 14A1 and 14A2 toward the top of FIG. 3B is larger than track pitch 300D between tracks 14A1 and 14A2 toward the bottom of FIG. 3B. Although this disclosure describes and illustrates particular changes in the pitch of particular tracks in particular sections of a particular track area, this disclosure contemplates any suitable changes in the pitch of any suitable tracks in any suitable sections of any suitable track area.

Figure 3C:
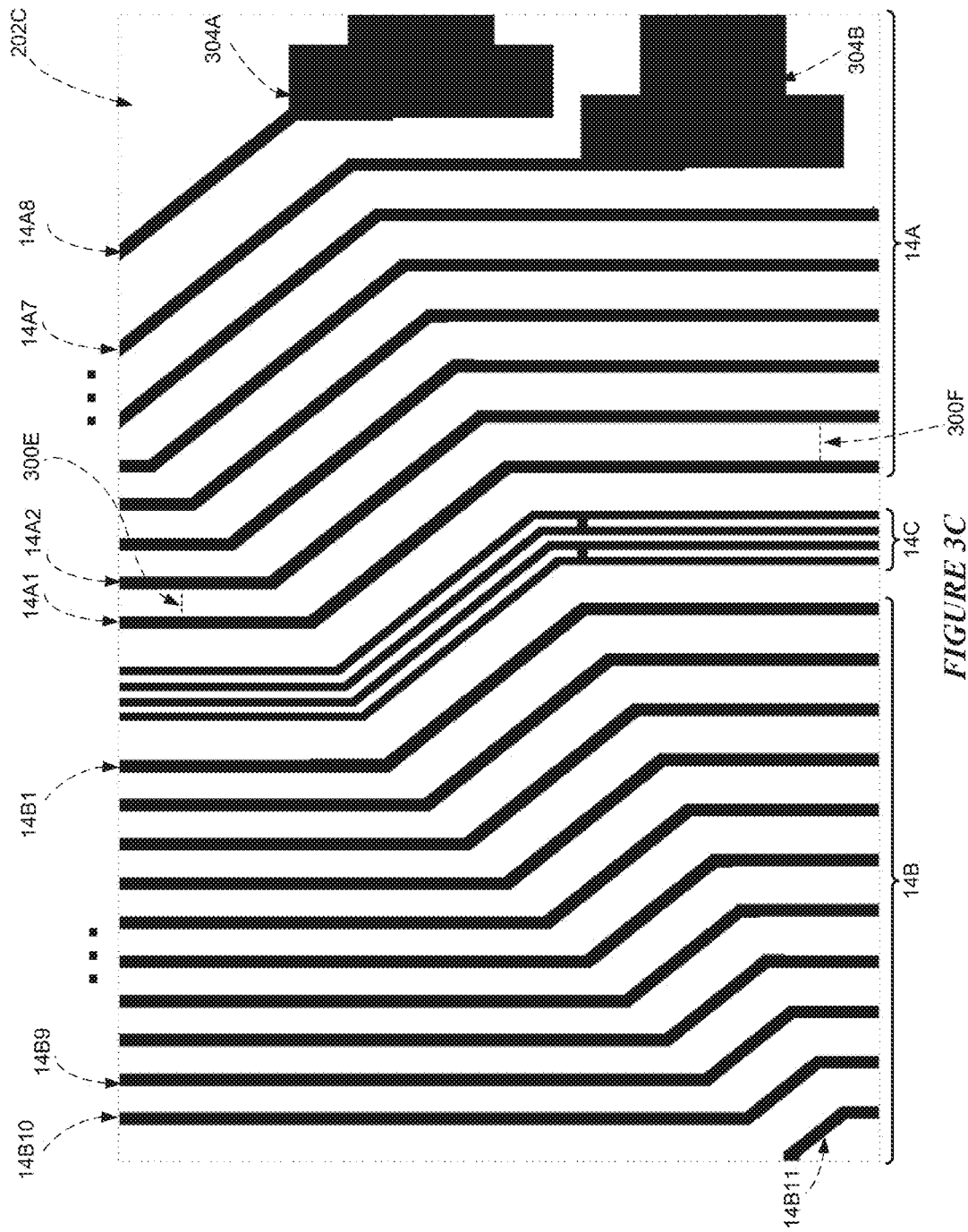
FIG. 3C illustrates another section of the tracking area of FIG. 2 with example tracks.

FIG. 3C (which is not necessarily shown to scale) illustrates section 202C of tracking area 212. In the example of FIG. 3C, there are tracks 14A-C, as described in FIG. 3A. Toward the bottom of FIG. 3C, there are 11 tracks 14B, with track 14B11 terminating at an edge of a drive electrode in touch-sensitive area 214. Toward the top of FIG. 3C, there are only ten tracks 14B. In contrast, the number of tracks 14A decreases from the top of FIG. 3C to the bottom of FIG. 3C, with tracks 14A7 and 14A8 terminating at bridges 304A-B. Bridges 304A-B may electrically couple tracks 14A7-8 to connection pads 16. Where the decrement in the number of tracks 14A is more than the increment in the number of tracks 14B, the pitch of tracks 14A increases. In the example of FIG. 3C, track pitch 300F between tracks 14A1 and 14A2 toward the bottom of FIG. 3C is larger than track pitch 300E between tracks 14A1 and 14A2 toward the top of FIG. 3C. Although this disclosure describes and illustrates particular changes in the pitch of particular tracks in particular sections of a particular track area, this disclosure contemplates any suitable changes in the pitch of any suitable tracks in any suitable sections of any suitable track area.

FIG. 3D (which is not necessarily shown to scale) illustrates section 202D of tracking area 212. In the example of FIG. 3D, there are tracks 14A-D, as described in FIG. 3A. Toward the top of FIG. 3D, there are 18 tracks 14B, with track 14B30 terminating at an edge of a drive electrode in touch-sensitive area 214. Toward the bottom of FIG. 3D, there are only 17 tracks 14B. In contrast, the number of tracks 14A stays the same throughout section 202D. Where the number of tracks 14B decreases in section 202D, the pitch of tracks 14A increases. In the example of FIG. 3D, track pitch 302B between tracks 14A1 and 14A2 toward the bottom of FIG. 3D is larger than track pitch 302A between tracks 14A1 and 14A2 toward the top of FIG. 3D. Although this disclosure describes and illustrates particular changes in the pitch of particular tracks in particular sections of a particular track area, this disclosure contemplates any suitable changes in the pitch of any suitable tracks in any suitable sections of any suitable track area.

FIG. 3E (which is not necessarily shown to scale) illustrates section 202E of tracking area 212. In the example of FIG. 3E, there are tracks 14A-D, as described in FIG. 3A. Furthermore, there are less tracks 14B in section 202E than in section 202D. In contrast, the number of tracks 14A in section 202E stays the same as in section 202D. Toward the top of FIG. 3E, there are three tracks 14B, with track 14B15 terminating at an edge of a drive electrode in touch-sensitive area 214. Toward the bottom of FIG. 3E, there are only two tracks 14B. In contrast, the number of tracks 14A stays the same throughout section 202E. Where the number of tracks 14B decreases in section 202E, the pitch of tracks 14A increases. In the example of FIG. 3E, track pitch 302D between tracks 14A1 and 14A2 toward the bottom of FIG. 3E is larger than track pitch 302C between tracks 14A1 and 14A2 toward the top of FIG. 3E. Although this disclosure describes and illustrates particular changes in the pitch of particular tracks in particular sections of a particular track area, this disclosure contemplates any suitable changes in the pitch of any suitable tracks in any suitable sections of any suitable track area.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
a first set of tracks configured to electrically couple a first set of connection pads of the touch sensor to a first set of electrodes of the touch sensor, the tracks of the first set of tracks comprising respective first portions and second portions, the respective first portions and the respective second portions of the tracks of the first set of tracks extending in a first direction, the respective first portions of the tracks of the first set of tracks being substantially parallel and the respective second portions of the tracks of the first set of tracks being substantially parallel; and
a second set of tracks configured to electrically couple a second set of connection pads of the touch sensor to a second set of electrodes of the touch sensor, a first track of the second set of tracks terminating at a location along the first track of the second set of tracks, a second track of the second set of tracks being substantially parallel to the respective second portions of the tracks of the first set of tracks;
the first set of tracks having a first pitch between the respective first portions of the tracks of the first set of tracks and a second pitch between the respective second portions of the tracks of the first set of tracks, the first and second pitches measured perpendicularly to the first direction, the first pitch being less than the second pitch, the respective second portions of the tracks of the first set of tracks positioned after, along the first direction, the location at which the first track of the second set of tracks terminates;
the respective first and second portions of the tracks of the first set of tracks extending in the first direction along at least a portion of a length of an edge of a touch-sensitive area of the touch sensor that also extends in the first direction for the portion of the length.

2. The touch sensor of claim 1, wherein the respective first portions and the respective second portions of the tracks of the first set of tracks are parallel to the portion of the length of the edge of the touch sensitive area of the touch sensor.

3. The touch sensor of claim 1, wherein:
the first set of electrodes are drive electrodes; and
the second set of electrodes are sense electrodes.

4. The touch sensor of claim 1, wherein the second set of tracks are located along the edge of the touch-sensitive area of the touch sensor.

5. The touch sensor of claim 1, wherein the first set of tracks are arranged in a cascading pattern.

6. The touch sensor of claim 1, wherein the second set of tracks are arranged in a cascading pattern.

7. The touch sensor of claim 1, wherein a difference between the first pitch and the second pitch is caused at least in part by different separation distances between the tracks of the first set of tracks.

8. The touch sensor of claim 1, wherein a difference between the first pitch and the second pitch is caused at least in part by different widths of the tracks of the first set of tracks.

9. The touch sensor of claim 1, wherein a difference between the first pitch and the second pitch is caused at least in part by the termination of the first track of the second set of tracks.

10. The touch sensor of claim 1, wherein the first and second set of electrodes are made of a mesh of fine lines of conductive material.

11. A device comprising:
a touch sensor comprising:
a first set of tracks configured to electrically couple a first set of connection pads of the touch sensor to a first set of electrodes of the touch sensor, the tracks of the first set of tracks comprising respective first portions and second portions, the respective first portions and the respective second portions of the tracks of the first set of tracks extending in a first direction, the respective first portions of the tracks of the first set of tracks being substantially parallel and the respective second portions of the tracks of the first set of tracks being substantially parallel; and
a second set of tracks configured to electrically couple a second set of connection pads of the touch sensor to a second set of electrodes of the touch sensor, a first track of the second set of tracks terminating at a location along the first track of the second set of tracks, a second track of the second set of tracks being substantially parallel to the respective second portions of the tracks of the first set of tracks; and
a computer-readable non-transitory storage medium embodying logic that is configured when executed to control the touch sensor;
the first set of tracks having a first pitch between the respective first portions of the tracks of the first set of tracks and a second pitch between the respective second portions of the tracks of the first set of tracks, the first and second pitches measured perpendicularly to the first direction, the first pitch being less than the second pitch, the respective second portions of the tracks of the first set of tracks positioned after, along the first direction, the location at which the first track of the second set of tracks terminates;
the respective first and second portions of the tracks of the first set of tracks extending in the first direction along at least a portion of a length of an edge of a touch-sensitive area of the touch sensor that also extends in the first direction for the portion of the length.

12. The device of claim 11, wherein the first set of tracks extend diagonally in a second direction between the respective first portions and the respective second portions of the tracks of the first set of tracks.

13. The device of claim 11, wherein:
the first set of electrodes are drive electrodes; and
the second set of electrodes are sense electrodes.

14. The device of claim 11, wherein the second set of tracks are located along the edge of the touch-sensitive area of the touch sensor.

15. The device of claim 11, wherein the first set of tracks are arranged in a cascading pattern.

16. The device of claim 11, wherein the second set of tracks are arranged in a cascading pattern.

17. The device of claim 11, wherein a difference between the first pitch and the second pitch is caused at least in part by different separation distances between the tracks of the first set of tracks.

18. The device of claim 11, wherein a difference between the first pitch and the second pitch is caused at least in part by different widths of the tracks of the first set of tracks.

19. The device of claim 11, wherein a difference between the first pitch and the second pitch is caused at least in part by the termination of the first track of the second set of tracks.

20. The device of claim 11, wherein the first and second set of electrodes are made of a mesh of fine lines of conductive material.

* * * * *